(12) United States Patent
Kawai et al.

(10) Patent No.: US 7,135,988 B2
(45) Date of Patent: Nov. 14, 2006

(54) TEMPERATURE RECORDER AND TEMPERATURE RECORDING AND CONTROLLING SYSTEM FOR POWER SUPPLY EQUIPMENT

(75) Inventors: Sigekazu Kawai, Gunma (JP); Hiroyuki Kuribara, Saitama (JP); Tsutomu Ishikura, Gunma (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 440 days.

(21) Appl. No.: 10/363,549

(22) PCT Filed: Sep. 4, 2001

(86) PCT No.: PCT/JP01/07643

§ 371 (c)(1),
(2), (4) Date: Jun. 12, 2003

(87) PCT Pub. No.: WO02/21088

PCT Pub. Date: Mar. 14, 2002

(65) Prior Publication Data

US 2004/0101024 A1    May 27, 2004

(51) Int. Cl.
*G08C 19/12* (2006.01)
(52) U.S. Cl. ............... 340/870.17; 340/870.28; 324/551; 702/58
(58) Field of Classification Search ............ 340/870.16, 340/870.17, 657, 870.28; 324/551; 702/58, 702/65
See application file for complete search history.

(56) References Cited

U.S. PATENT DOCUMENTS

| 4,268,818 | A | * | 5/1981 | Davis et al. ............ 340/870.38 |
| 4,829,298 | A | * | 5/1989 | Fernandes .............. 340/870.27 |
| 5,126,621 | A | * | 6/1992 | Morton et al. .............. 313/237 |
| 5,181,026 | A | * | 1/1993 | Granville ............... 340/870.28 |
| 5,764,065 | A | * | 6/1998 | Richards et al. ............ 324/551 |

FOREIGN PATENT DOCUMENTS

| JP | 63-036116 | 2/1988 |
| JP | 63-235837 | 9/1988 |
| JP | 03-048736 | 5/1991 |
| JP | 03-107724 | 5/1991 |
| JP | 04-138038 | 5/1992 |
| JP | 06-221732 | 8/1994 |
| JP | 10-162280 | 6/1998 |

OTHER PUBLICATIONS

PCT Form IB 338 and PCT Form IPEA 409 dated Mar. 25, 2003.

* cited by examiner

*Primary Examiner*—Timothy Edwards, Jr.
(74) *Attorney, Agent, or Firm*—McGinn IP Law Group, PLLC

(57) ABSTRACT

A temperature recorder capable of storing, in time sequence, measured temperatures and measured times as temperature records in a memory incorporated therein, wherein, the temperature recorder is installed in a power line for temperature recording and, when the power line supplies a power in a normal temperature range, wirelessly transmits the temperature record to a monitor at a frequency of once every half day and, when an abnormal heating is detected from the power line, wirelessly transmits the temperature record as a temperature alarm record.

12 Claims, 10 Drawing Sheets

US 7,135,988 B2

TEMPERATURE RECORDER AND TEMPERATURE RECORDING AND CONTROLLING SYSTEM FOR POWER SUPPLY EQUIPMENT

TECHNICAL FIELD

The invention relates to a temperature recorder, and a temperature recording and controlling system for power supply equipment, and more particularly to a temperature recorder, and a temperature recording and controlling system for power supply equipment, which monitor a change in temperature of power supply equipment such as power lines, insulators, and clamps.

BACKGROUND ART

In power supply equipment such as power lines and electric power substations, maintenance/inspection has hitherto been visually carried out mainly by a worker for inspection. In some installation environment or scale of the power supply equipment, however, satisfactory maintenance work cannot be carried out. For example, in power supply equipment in a place between mountains, a high place, or a cold district of much snowfall, work burden at the time of inspection is large, and, in some weather or the like, inspection work is dangerous. In order to solve the above problem, for example, Japanese Patent Laid-Open No. 162280/1998 discloses a power line monitoring system. This power line monitoring system comprises a radio sensor capable of obtaining electric power from a built-in transformer installed in a power line, a receiver/transmitter provided in a power transmission tower, and a photoelectric field sensor which performs photoelectric conversion of sensor output received in the receiver/transmitter and transmits the converted data to a monitoring device provided in an electric power substation through an optical fiber composite overhead earthwire (OPGW). Light (continuous light) is transmitted from the electric power substation to the photoelectric field sensor through OPGW. The photoelectric field sensor transmits light modulated based on a signal sent from the radio sensor to the monitoring device through OPGW. This modulated light is analyzed in the monitoring device to obtain information associated with the power line, i.e., information on voltage, current, and conductor temperature.

According to the power line monitoring system described in Japanese Patent Laid-Open No. 162280/1998 noted above, equipment such as a transformer for supplying electric power necessary for the operation should be provided. This leads to an increase in size and an increase in weight of the sensor and thus deteriorates the working efficiency of installation on the site. Further, disadvantageously, the place where the sensor can be installed is restricted. Furthermore, since the state of the power line is detected based on light output and sent from the monitoring device, in order to detect the state of the power line in real time, the operating ratio of the monitoring device should be increased. This poses a problem of increased operation cost.

Accordingly, it is a first object of the invention to provide a small temperature recorder for power supply equipment, which can be easily installed in the power supply equipment without restrictions on installation places.

It is a second object of the invention to provide a temperature recording and controlling system for power supply equipment, which can reduce the operating ratio of a monitoring device during power transmission in a normal temperature range and, upon the occurrence of an abnormal phenomenon such as abnormal heat generation in the power line, can promptly send information on this fact.

DISCLOSURE OF THE INVENTION

According to the invention, a temperature recorder provided with a memory for storing temperature records based on measurement with a temperature sensor is fixed to power supply equipment such as power lines. This temperature recorder wirelessly sends, at predetermined intervals, temperature records obtained by temperature measurement at predetermined measuring intervals to transmit the data to the monitoring device. By virtue of this construction, power supply equipment can be monitored without increasing the operating ratio of the monitoring device.

BEST MODE FOR CARRYING OUT THE INVENTION

Figure 1:
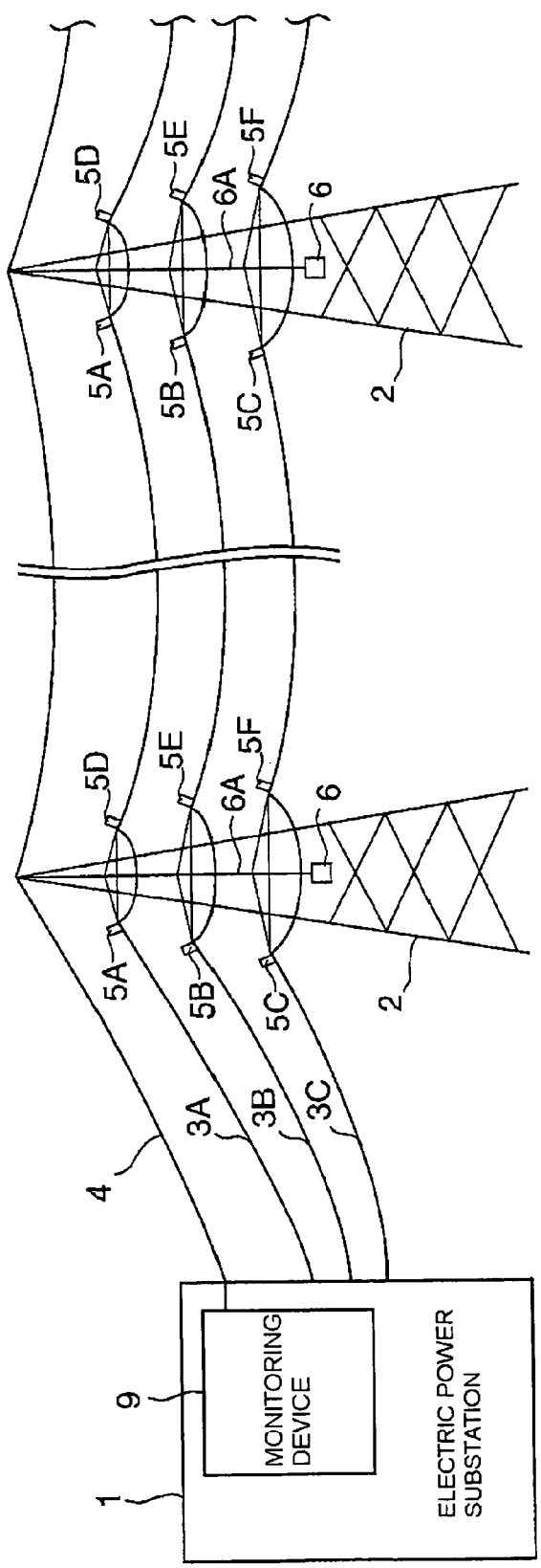
FIG. 1 is a schematic diagram showing the construction of power supply equipment in an embodiment of the invention.

The temperature recorder and the temperature recording and controlling system for power supply equipment according to the invention will be explained in detail with reference to the accompanying drawings. FIG. 1 is a schematic diagram showing the construction of power supply equipment in an embodiment of the invention. The power supply equipment includes: an electric power substation 1 for transmitting electric power; power lines 3A, 3B, and 3C which have been extended from the electric power substation 1 through a power transmission tower 2; an optical fiber composite overhead earth-wire (OPGW) 4 provided on the top of the power transmission tower 2; temperature recorders 5A, 5B, 5C, 5D, 5E, and 5F which are installed respectively in the power lines 3A, 3B, and 3C in their tower supporting portions to detect the temperatures of the power lines 3A, 3B, and 3C, records the detected temperatures together with the measured time as temperature records in a temperature recording part which will be described later, and, in addition, wirelessly transmits the temperature records; a power transmission tower-side reception/transmission station 6 which communicates with the temperature recorders 5A, 5B, 5C, 5D, 5E, and 5F based on the radio waves; a signal line 6A which connects OPGW 4 to the power transmission tower-side reception/transmission station 6; and a monitoring device 9 for analyzing the temperatures of the power lines 3A, 3B, and 3C based on the temperature records introduced through OPGW 4.

Figure 2:
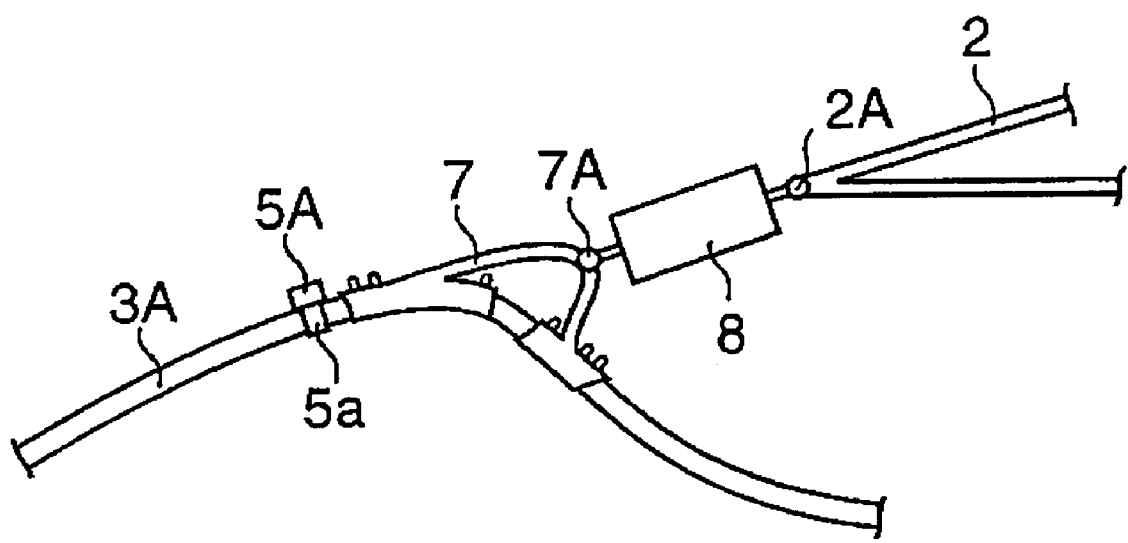
FIG. 2 is an enlarged view of a temperature recorder installed in a power line.

FIG. 2 is an enlarged view of a temperature recorder 5A installed in a power line 3A. The temperature recorder 5A is installed with a metal fixture 5a near a clamp 7 for installing the power line 3A in the power transmission tower 2. The clamp 7 is supported on a fixed part 2A in the power transmission tower 2 through an insulator device 8 mounted on an insulator connection 7A. Likewise, the other temperature recorders 5B, 5C, 5D, 5E, and 5F are installed in the power lines 3A, 3B, and 3C.

Figure 3:
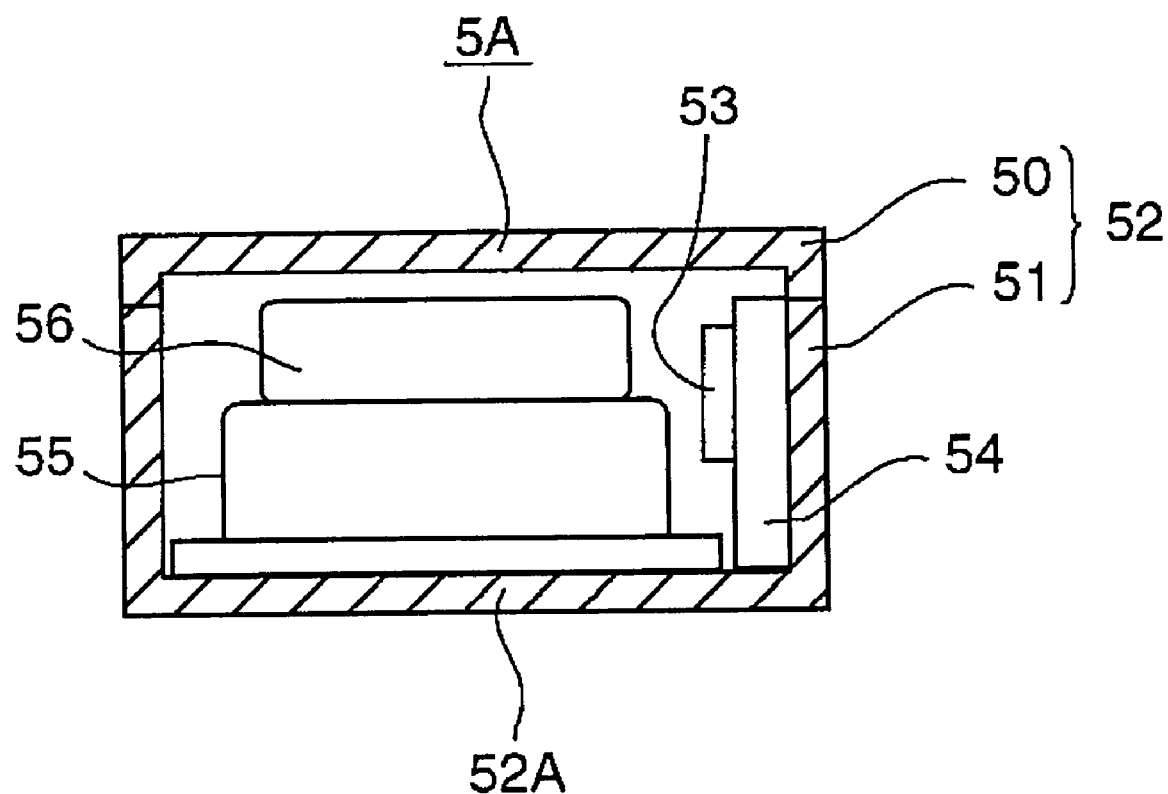
FIG. 3 is a side view of the interior, in an opened state, of a temperature recorder in an embodiment of the invention.

FIG. 3 shows the interior of the temperature recorder 5A in a side face direction. In this embodiment, since the temperature recorders 5A, 5B, 5C, 5D, 5E, and 5F are identical to one another in construction, the temperature recorder 5A will be explained as a representative example.

The temperature recorder 5A includes: a watertight case 52 comprising a lid part 50 and a body 51; a circuit board 54 which has been vertically housed in the case 52 and comprises circuit components such as a semiconductor device 53 for measuring operation and communication operation; a temperature recording part 55 which includes a temperature sensor therein, performs temperature measurement at: predetermined time intervals, and stores the measured temperature and the measured time as temperature records in a memory which will be described later; and a battery 56 such as a lithium battery for supplying electric power necessary for measuring operation and communication operation. The temperature recording part 55 measures the temperature with a temperature sensor incorporated in the temperature recording part 55 through a measuring face 52A having excellent thermal conductivity. The circuit board 54 is configured so as to function as an antenna during communication operation. The size of the temperature recorder 5A in this embodiment is 35 mm in length×35 mm in width×20 mm in height.

Figure 4:
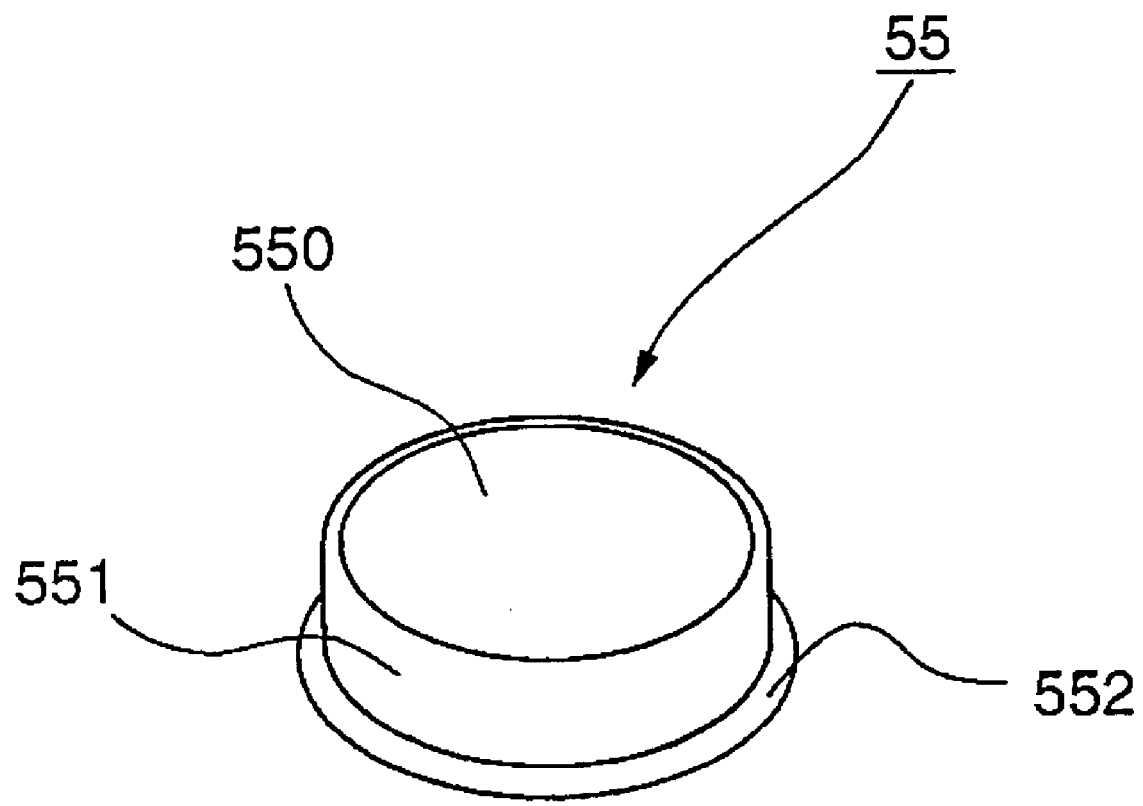
FIG. 4 is a perspective view of a temperature recording part in an embodiment of the invention.
Figure 5:
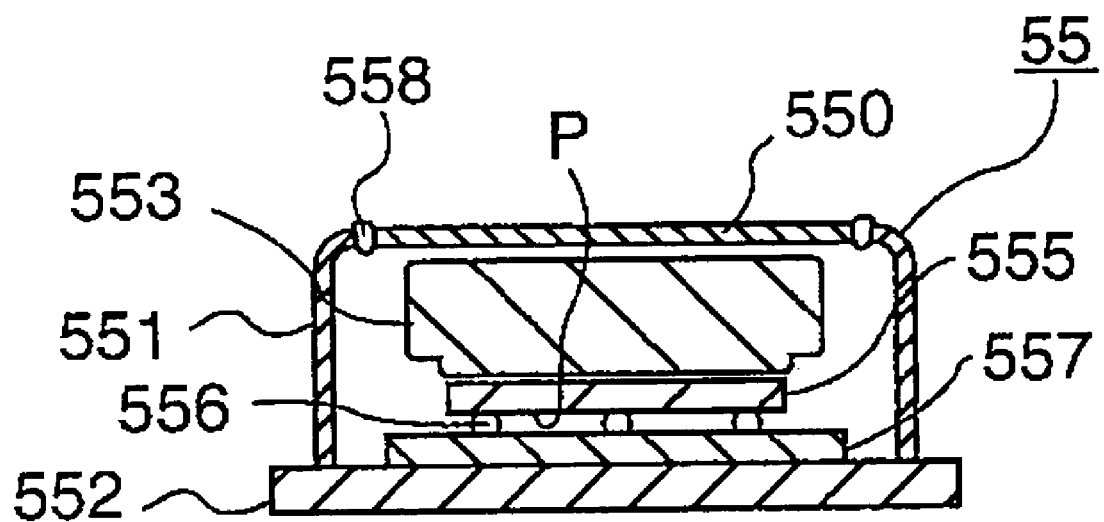
FIG. 5 is a cross-sectional view of a temperature recording part in an embodiment of the invention.

FIGS. 4 and 5 show the temperature recording part 55. This temperature recording part 55 is one which has been commercialized as "Button Cool Memory" by the present applicant. As shown in FIG. 4, the temperature recording part 55 includes a metal case formed of a material such as stainless steel and, provided on the outside of the metal case, a data input/output (I/O) terminal 550 provided on the upper part of the metal case, a ground terminal 551 provided on the cylindrical side face, and a collar part 552 provided on the bottom of the metal case. As shown in FIG. 5, a lithium battery 553 for supplying electric power to the circuit, a semiconductor chip 555 provided with a temperature sensor for temperature detection, and a circuit board 557 onto which the semiconductor chip 555 has been fixed through a bump 556 of solder or the like are housed in the metal case. A circuit pattern formed face P of the semiconductor chip 555 is disposed so as to face the circuit board 557.

In the temperature sensor, a PN junction diode provided in the semiconductor chip 555 is used for temperature detection, and a change in temperature (0° C. to 90° C.) of the power line 3A is detected based on a comparison of the forward voltage with the reference voltage. A sealing member 558 for short circuit prevention and watertight structure formation purposes is provided between the data I/O terminal 550 and the ground terminal 551. A spacer (not shown) formed of a resin material is inserted into the metal case to fill the space within the metal case. The outer diameter of the temperature recording part 55 is about 17 mm.

Figure 6:
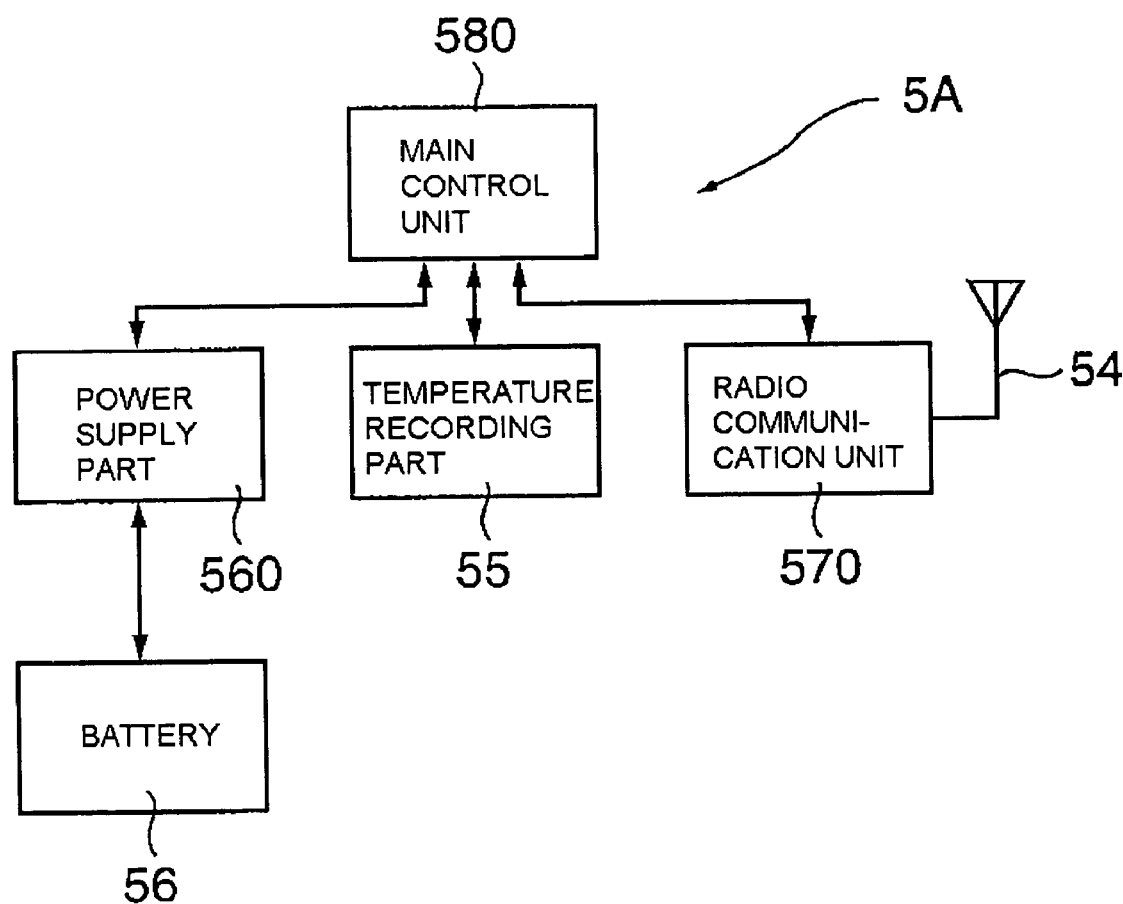
FIG. 6 is a schematic diagram showing the construction of a temperature recorder in an embodiment of the invention.

FIG. 6 is a schematic diagram showing the construction of the temperature recorder 5A. In the temperature recorder 5A, a power supply part 560, a temperature recording part 55, and a radio communication part 570 are controlled by a main control unit 580. The main control unit 580 includes an interface (I/F) part (not shown) and is configured to be connected to a terminal device such as a personal computer to receive data necessary for initial setting or the like.

The power supply part 560 supplies proper electric power from a battery 56 based on a power supply signal sent from the main control unit 580 at the time of temperature measuring operation and communication operation and in standby state at the time of non-operation and, in addition, outputs data on residual capacity of the battery upon the receipt, from the main control unit 580, of a request for sending data on the residual capacity of the battery 56.

The temperature recording part 55 executes temperature measurement and temperature recording based on initial values set before installation of the temperature recorder 5A on the site by a terminal device connected to the I/F part in the main control unit 580, that is, measuring time intervals, setting of temperature alarm for storing a temperature record as a temperature alarm record upon the detection of abnormal heat generation (for example, 90° C. or above), a time zone in which temperature measurement is not carried out, and the like. Further, upon the detection of abnormal heat generation, the temperature recording part 55 sends a request-to-send signal of a temperature alarm record to the main control unit 580.

The radio communication part 570 sets a frequency for communication with the power transmission tower-side reception/transmission station 6, encodes the temperature record and the temperature alarm record, superposes the coded data on a radio wave of a predetermined frequency band (315 MHz), followed by transmission through the circuit board 54 serving also as an antenna.

Figure 7:
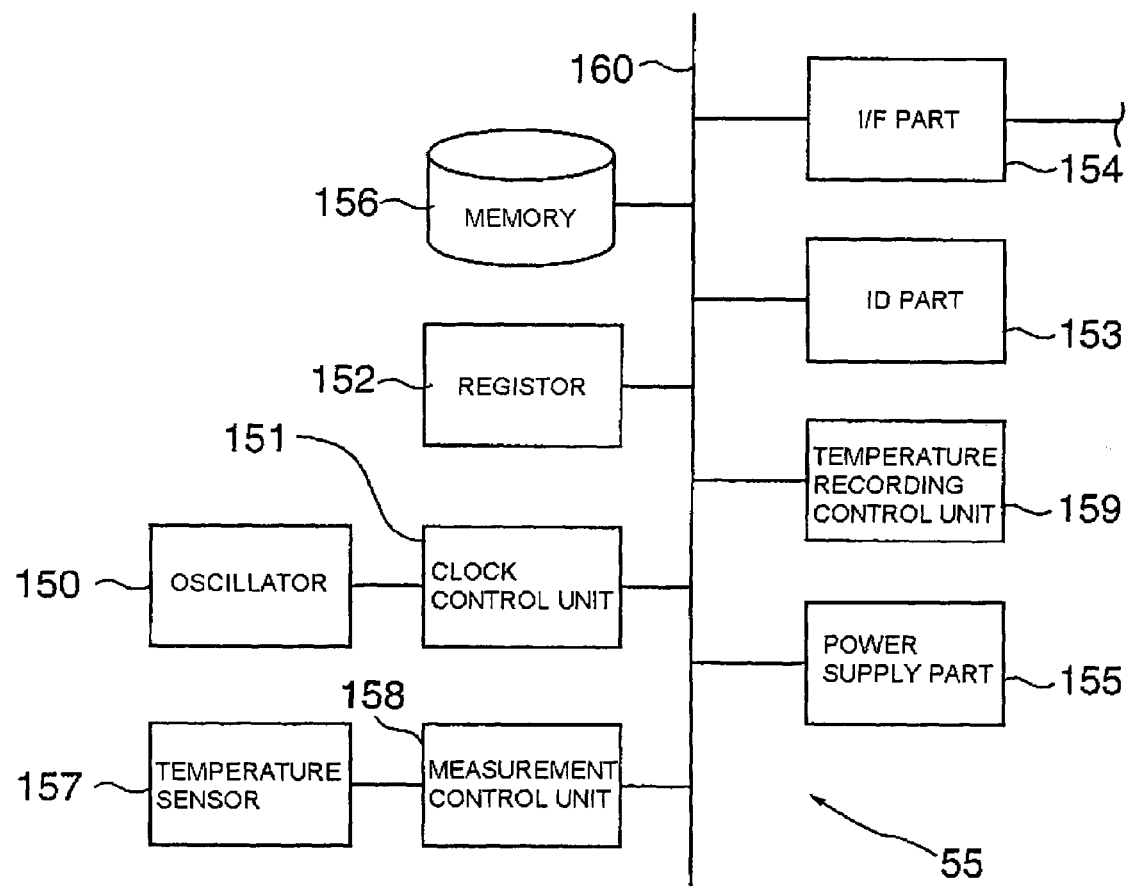
FIG. 7 is a diagram showering the construction of a circuit in a temperature recording part in an embodiment of the invention.

FIG. 7 shows the construction of a circuit in the temperature recording part 55. In the temperature recording part 55, an internal bus 160 connects the following parts to one another: a clock control unit 151 for controlling a clock function within the circuit based on a reference clock output from an oscillator 150; a register 152 for temporarily storing time data output from the clock control unit 151; an ID part 153 for storing an unique 64-bit serial number assigned to the temperature recording part 55; an interface (I/F) part 154 for controlling data I/O operations between the main control unit 580 and the radio communication part 570; a power supply part 155 such as a lithium battery for supplying electric power to the circuit; a memory 156 for storing various programs, for example, for temperature recording operation and temperature record output operation, and any data; a temperature sensor 157 for outputting a temperature detection signal according to the temperature; a measurement control unit 158 which performs A/D conversion of the temperature detection signal and outputs the converted data together with the output of the clock control unit 151 to the memory 156; and a temperature recording control unit 159 for controlling each part.

Figure 8:
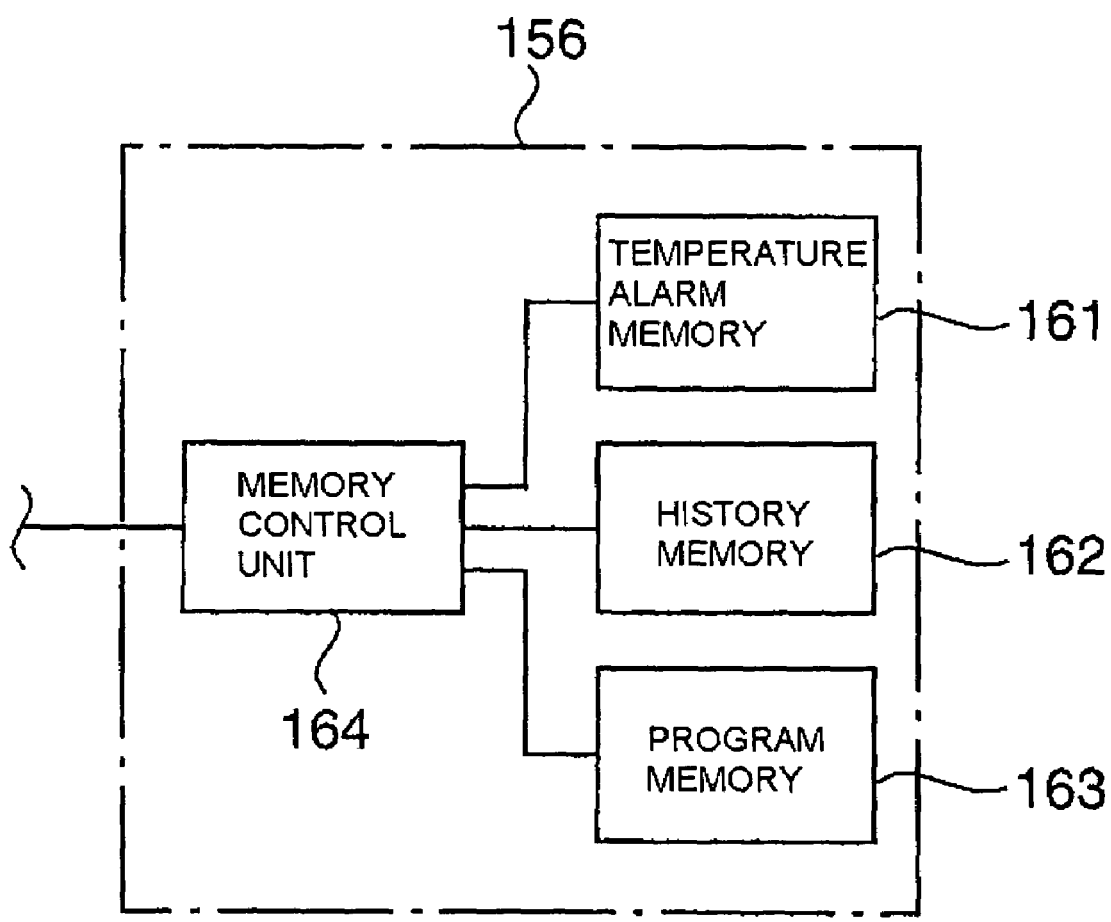
FIG. 8 is a diagram showing the construction of a memory in a temperature recording part in an embodiment of the invention.

FIG. 8 shows the memory 156. The memory 156 comprises a temperature alarm memory 161 for storing temperature alarm records based on abnormal heat generation, a history memory 162 for storing, as history, temperature measuring conditions, other data, and temperature records based on measured values of temperature input at predetermined measurement intervals from the start of the measurement, a program memory 163 for storing various programs, and a memory control unit 164 for controlling writing in and reading from each memory area. Upon a shortage of memory area due to the accumulation of temperature data and the like, the history memory 162 stops the storage of temperature data according to measuring conditions, or erases the oldest data and stores the latest data.

The operation of the temperature recorder and the temperature recording and controlling system in the power supply equipment according to the invention will be explained in conjunction with the accompanying drawings. The input of initial set values will be first explained. A terminal device is connected through the I/F part in the main control unit 580 to the temperature recorder 5A, and initialization is carried out based on input operation by an operator. In this initialization operation, the main control unit 580 reads the serial number stored in the ID part 153 in the temperature recording part 55. After the initialization, the terminal device executes initial setting of the temperature recording part 55, for example, with respect to temperature measuring conditions such as alarm temperature, first measuring intervals (for example, one hr) in normal operation, measuring time zone, and second measuring intervals (for example, 5 min) after the measurement of the alarm temperature, intervals (for example, once every half day) of communication with the power transmission tower-side reception/transmission station 6, and communication procedure. Further, association with unique ID assigned to the power transmission tower-side reception/transmission station 6 with which communication is to be carried out. The main control unit 580 stores these initial set values in a built-in memory (not shown).

After initial setting, the temperature recorder 5A is installed in a power line 3A with a metal fixture 5a. After the installation, the monitoring device 9 sends a test communication request signal to the power transmission tower-side reception/transmission station 6. Based on a serial number request signal of the temperature recording part 55, the power transmission tower-side reception/transmission station 6 communicates with each of the temperature recorders 5A, 5B, 5C, 5D, 5E, and 5F installed in the power transmission tower 2 to check the temperature recorders for interference and disruption of communication.

Next, temperature measuring operation will be explained. The temperature recording part 55 measures the temperature of the power line 3 at the first measuring intervals based on the initial set value. In this temperature measuring operation, the temperature of the power line 3A conducted through the measuring face 52A in the case 52 is detected with the temperature sensor 157. The detected temperatures are converted, in the measuring control unit 158, to electric signals corresponding to the temperatures which are then successively stored in the history memory 162 of the memory 156. At that time, the time data output from the clock control unit 151 is also stored as a measurement time. The power supply part 560 supplies electric power necessary for temperature measurement and temperature recording in the temperature recording part 55. After the completion of these operations, the power supply part 560 supplies electric power in a low-power consumption standby mode from the battery 56.

Next, the transmission of temperature records will be explained. The main control unit 580 operates the radio communication part 570 at communication intervals based on the initial set value to transmit temperature records to the power transmission tower-side reception/transmission station 6. In the communication, the serial number of the temperature recording part 55 to the power transmission tower-side reception/transmission station 6 is transmitted. Subsequently, the temperature records stored in the history memory 162 are successively sent based on radio waves. The power transmission tower-side reception/transmission station 6 transmits signal light, obtained by photoelectric conversion of a received wave based on the temperature record, to OPGW 4 through a signal line 6A. In the electric power substation 1, the monitoring device 9 receives the signal light through OPGW 4, and the signal light is then subjected to photoelectric conversion to analyze the temperature record.

When the monitoring device 9 sends, to the temperature recorders 5A, 5B, 5C, 5D, 5E, and 5F, a request for transmission of a temperature record, the monitoring device 9 sends signal light according to the request-to-send signal to the power transmission tower-side reception/transmission station 6 through OPGW 4.

Figure 9:
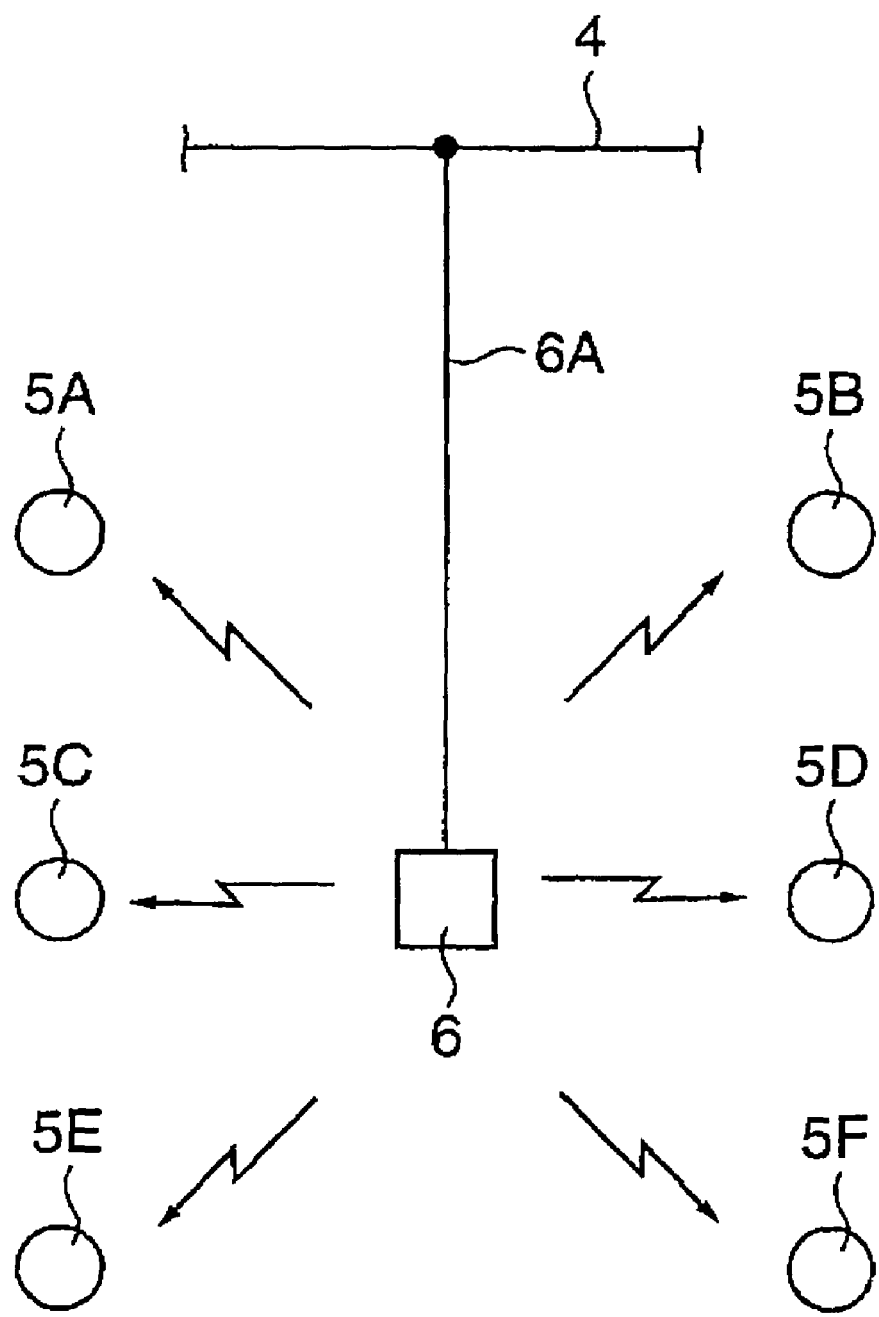
FIG. 9 is a diagram illustrating request-to-send operation from a power transmission tower-side reception/transmission station in communication operation of temperature recorders in an embodiment of the invention.

FIG. 9 shows request-to-send operation from the power transmission tower-side reception/transmission station 6 in the operation of communication between the temperature recorders 5A, 5B, 5C, 5D, 5E, and 5F and the power transmission tower-side reception/transmission station 6. The power transmission tower-side reception/transmission station 6 performs photoelectric conversion of signal light received through OPGW 4 and the signal line 6A, superposes the converted data on a radio wave, followed by transmission of the superposed data.

Figure 10:
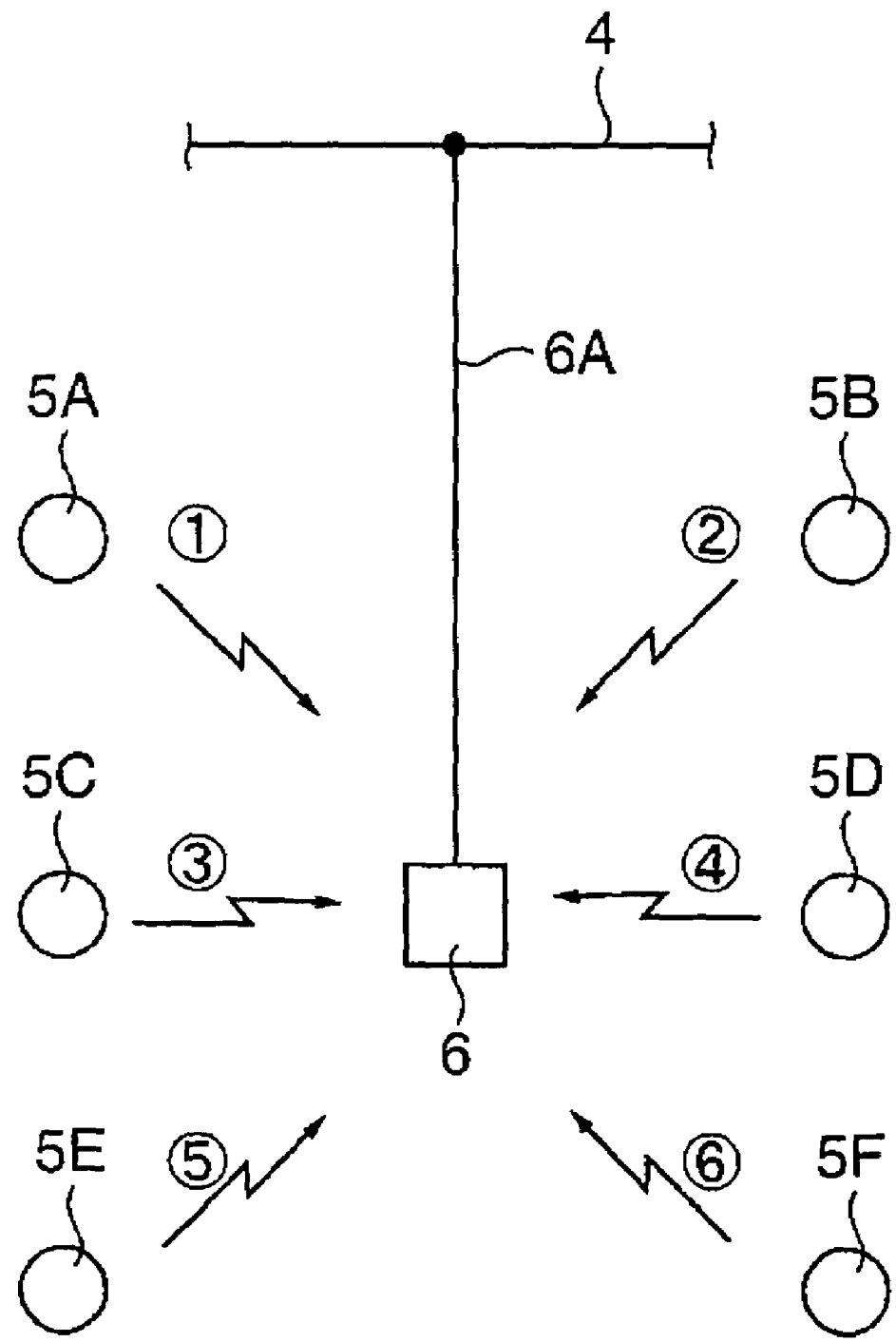
FIG. 10 is a diagram illustrating the operation of transmission of temperature records of individual temperature recorders in communication operation of temperature recorders in an embodiment of the invention.

FIG. 10 shows the operation of transmission of a temperature record in each temperature recorder. Based on the request-to-send signal received from the radio communication part 570, the main control unit 580 in each temperature recorder sends, to the temperature recording part 55, a request for the output of the temperature record, and the temperature record is transmitted from the temperature recorders in the order indicated in the drawing to the power transmission tower-side reception/transmission station 6. The power transmission tower-side reception/transmission station 6 transmits signal light, obtained by photoelectric conversion of the received radio wave, to the monitoring device 9 through the signal line 6A and OPGW 4. The monitoring device 9 receives the signal light and performs photoelectric conversion to analyze the temperature record for the power line 3A.

Next, the transmission of a temperature alarm record will be explained. Upon the detection of abnormal heat generation of the power line 3A, the temperature recording part 55 stores the temperature record as a temperature alarm record in the temperature alarm memory 161 in the memory 156 and, in addition, sends a request-to-send signal of the temperature alarm record to the main control unit 580. Based on the request-to-send signal, the main control unit 580 operates the radio communication part 570 to send the temperature alarm record to the power transmission tower-side reception/transmission station 6. The temperature recording part 55 changes the temperature measuring intervals after the detection of abnormal heat generation to the second measuring intervals and measures the temperature of the power line 3A at the second measuring intervals.

According to the above temperature recording and controlling system for power supply equipment, in the temperature recorder, the measured temperatures and measured times of the power line are stored as temperature records in time sequence in a built-in memory. Therefore, when the power line supplies a power in a normal temperature range, the temperature record may be transmitted, for example, at a frequency of once a day. This can reduce the operation cost of the temperature recording and controlling system and, at the same time, can reduce the consumption of power for communication with a reception/transmission station. The temperature record stored in the memory can be if necessary read and sent to the monitoring device side.

Further, when a semiconductor-type temperature sensor is used, electric power necessary for temperature measurement is very small. Even when a battery is used as the power supply, the maintenance period until the expiration of the service life can be extended. By virtue of this, the size of the temperature recorder can be reduced. If the exhaustion speed of the battery is very high, it is expected that temperature rise in the temperature recorder installation site is significant, suggesting that some abnormal phenomenon has occurred in the power line. Therefore, prompt maintenance/inspection is desired.

Further, since the size of the temperature recorder can be reduced, the influence of electric fields, generated based on power transmission, on the circuit can be reduced. Therefore, the difference between the measured temperature and the actual temperature can be reduced.

In the embodiments of the invention, the temperature recorder and the temperature recording and controlling system for measuring the temperature of the power line in its portion near the clamp installed in the power line have been explained. The temperature recorder, however, can be installed in other places. For example, the temperature recorder and the temperature recording and controlling system can be applied to the measurement of the temperature of main circuit connection, non-conductive members such as electrical porcelain, for example, in electric power substations.

As described above, in the temperature recorder for power supply equipment according to the invention, temperature records comprising temperatures, measured at predetermined measuring intervals, and measured times are stored in a memory and are wirelessly transmitted at predetermined intervals. Therefore, the temperature recorder can be easily installed in power supply equipment without restrictions on installation locations, for example, in a place between mountains, a high place, a place of much snowfall, and a dangerous place, and, at the same time, the size of the temperature recorder can be reduced.

Further, the temperature recording and controlling system for power supply equipment according to the invention receives a radio wave based on the temperature record obtained in the above temperature recorder, converts the radio wave to an optical signal which is then transmitted to a monitoring device through an optical transmission line. Therefore, when power is supplied in a normal temperature range, the operation of the monitoring device can be reduced. At the same time, upon the occurrence of an abnormal phenomenon such as abnormal heat generation in the power line, information on this fact can be promptly sent.

INDUSTRIAL APPLICABILITY

As described above, the temperature recorder and temperature recording and controlling system for power supply equipment according to the invention are suitable for use in monitoring of objects where monitoring work by a worker is dangerous or difficult due to a high place, a high voltage, or a high electric field.

The invention claimed is:

1. A temperature recorder for power supply equipment, said temperature recorder comprising:
   a temperature sensor adapted to be installed in power supply equipment to measure temperature at predetermined measuring intervals and generate a temperature detection signal;
   a memory to store temperature records, based on the temperature detection signal;
   a circuit board having the temperature sensor and the memory thereon;
   a battery to supply electric power to the circuit board;
   a watertight case having the circuit board and the battery therein;
   a communication unit comprising a transmitting part to wirelessly transmit the temperature record;
   a control unit to control the communication unit, to wirelessly transmit temperature records stored in the memory at predetermined transmission intervals; and
   a watertight housing having the case, the communication unit, and the control unit housed therein,
   wherein the housing is adapted to be fixed onto the power supply equipment.

2. The temperature recorder for power supply equipment according to claim 1, wherein the memory comprises:
   a history memory to store the temperature records in time sequence; and
   a temperature alarm memory to store, in time sequence, records of temperature outside a normal temperature range, as temperature alarm records.

3. The temperature recorder for power supply equipment according to claim 1, wherein the communication unit comprises a receiving part adapted to receive an instruction for the output of the temperature record from an externally provided monitoring device.

4. The temperature recorder for power supply equipment according to claim 1, wherein the control unit is responsive to a temperature alarm record indicating a deviation of the temperature from a normal temperature, to control the communication unit to wirelessly transmit the temperature alarm record, and to control the temperature sensor to measure the temperature at measuring intervals which are shorter than the predetermined measuring intervals.

5. The temperature recorder for power supply equipment according to claim 1, wherein the control unit is responsive to a temperature alarm record indicating a deviation of the temperature from a normal temperature, to control the communication unit to wirelessly transmit the temperature alarm record.

6. The temperature recorder for power supply equipment according to claim 1, wherein the control unit is responsive to a temperature alarm record indicating a deviation of the temperature from a normal temperature, to control the temperature sensor to measure the temperature at measuring intervals which are shorter than the predetermined measuring intervals.

7. A temperature recording and controlling system for power supply equipment, said system comprising:
   a temperature recorders comprising a watertight housing, a temperature sensor within the housing, the temperature sensor being adapted to be installed in power supply equipment to measure the temperature of the power supply equipment at predetermined measuring intervals, a memory to store a temperature detection signal based on the measured temperature, together with the measurement time, as a temperature record, a circuit board having the temperature sensor and the memory thereon, a battery to supply electric power to the circuit board, a watertight case having the circuit board and the battery therein, a communication unit to wirelessly transmit the temperature record as a radio signal, and a control unit to control the communication unit to wirelessly transmit temperature records stored in the memory at predetermined transmission intervals;

an optical signal transmitting device adapted to receive the radio signal, convert the radio signal to an optical signal based on the temperature record, and to send the optical signal to an optical transmission line; and a monitoring device adapted to receive the optical signal through the optical transmission line.

8. The temperature recording and controlling system for power supply equipment according to claim 7, the temperature recorder is responsive to a temperature alarm record indicating a deviation of the temperature from a normal temperature range, to control the communication unit to wirelessly transmit the temperature record, and to control the temperature sensor to measure the temperature at measuring intervals which are shorter than the predetermined measuring intervals.

9. The temperature recording and controlling system for power supply equipment according to claim 7, wherein the optical transmission line comprises an optical fiber composite overhead earth-wire provided along a power line.

10. The temperature recording and controlling system for power supply equipment according to claim 7, wherein the monitoring device comprises:

a photoelectric transducer to convert the optical signal to an electrical signal, and a terminal device to receive the electrical signal and for analyzing the temperature record.

11. The temperature recording and controlling system for power supply equipment according to claim 7, wherein the temperature recorder is responsive to a temperature alarm record indicating a deviation of the temperature from a normal temperature range, to control the communication unit to wirelessly transmit the temperature record.

12. The temperature recording and controlling system for power supply equipment according to claim 7, wherein the temperature recorder is responsive to a temperature alarm record indicating a deviation of the temperature from a normal temperature range, to control the temperature sensor to measure the temperature at measuring intervals which are shorter than the predetermined measuring intervals.

* * * * *